(12) United States Patent
Yoshihara et al.

(10) Patent No.: US 6,874,523 B2
(45) Date of Patent: Apr. 5, 2005

(54) FLUID CUTOFF VALVE DEVICE

(75) Inventors: Koichi Yoshihara, Fujisawa (JP); Takayuki Ota, Hamamatsu (JP)

(73) Assignees: NOK Corporation, Tokyo (JP); Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 10/312,576

(22) PCT Filed: Jul. 16, 2001

(86) PCT No.: PCT/JP01/06139

§ 371 (c)(1),
(2), (4) Date: Sep. 23, 2003

(87) PCT Pub. No.: WO02/06660

PCT Pub. Date: Jan. 24, 2002

(65) Prior Publication Data

US 2004/0050418 A1 Mar. 18, 2004

(30) Foreign Application Priority Data

Jul. 17, 2000 (JP) .............................. 2000-215699

(51) Int. Cl.⁷ .............................................. F16K 24/04
(52) U.S. Cl. ........................................ 137/202; 137/43
(58) Field of Search ................................... 137/43, 202

(56) References Cited

FOREIGN PATENT DOCUMENTS

| JP | 9-32671 | 4/1997 |
| JP | 11-37008 | 9/1999 |

*Primary Examiner*—Gerald A. Michalsky
(74) *Attorney, Agent, or Firm*—Jacobson Holman PLLC

(57) ABSTRACT

In the case where a full-tank state is brought about by feed, excessive ascent of a liquid level in a loading arm is suppressed and excessive feed is prevented. A finned umbrella valve is provided for throttling a flowrate of a fuel vapor prior to closing of a float valve.

5 Claims, 9 Drawing Sheets

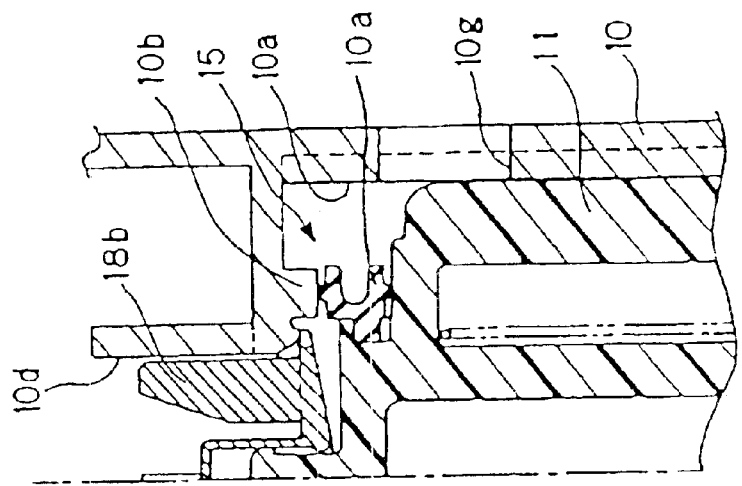
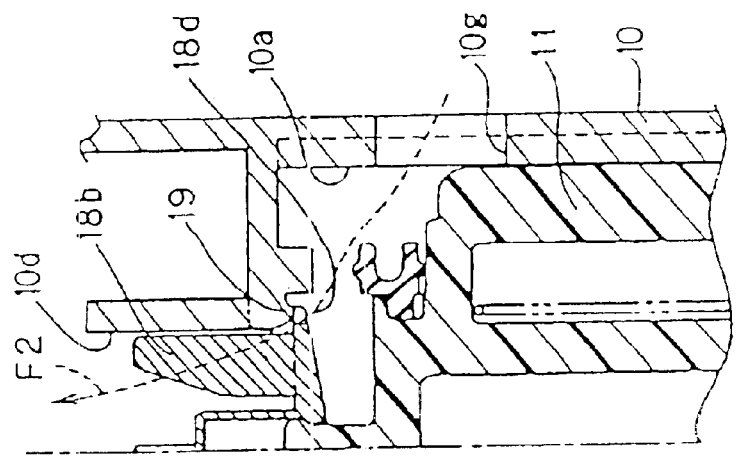
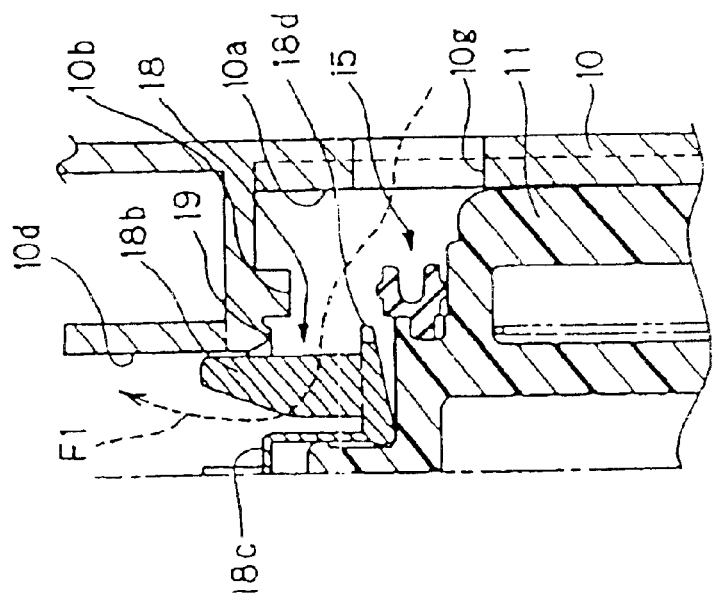

FLUID CUTOFF VALVE DEVICE

This is a nationalization of PCT/JP01/06139, filed Jul. 16, 2001 and published in Japanese.

TECHNICAL FIELD

The present invention relates to a liquid shut-off valve device provided with a float valve, which is capable of discharging a gas in a sealed container such as fuel tanks or the like.

BACKGROUND ART

An explanation will be given below to a constitution of a fuel vapor drain control system 101 according to the conventional art with reference to FIG. 6. FIG. 6 is a view illustrating a schematic constitution of the fuel vapor drain control system 101 for controlling a fuel vapor (referred below to as vapor containing a mixed gas of air and a vaporized fuel) in a fuel tank according to the prior art, in an automobile provided with an engine, in which gasoline, gas oil or the like is used as fuel (feeding state).

A fuel supply section including a fuel tank 102 and the fuel vapor drain control system 101 in an automobile is an important safety part under the application of safety regulations concerning fuel leakage at the time of collision, pressure control of fuel vapor generated in a fuel tank due to vibrations during running of a vehicle and changes in environmental temperature, or the like and under the application of law regulations such as pollution control for prevention discharging of fuel vapor to the atmosphere, or the like, and must be taken account in various points to prevent leakage of a fuel even in the case where a vehicle is inclined and circles round, from the viewpoint of safety.

102 denotes a fuel tank, and 103 a loading arm having a fill opening 103a and extending into the fuel tank 102. Arranged above the fuel tank 102 are a fuel vapor discharge device 104 and fuel shut-off valves 105a, 105b, which prevent excessive oil feed at the time of feed.

The fuel vapor discharge device 104, of which cross sectional construction is shown in detail in FIG. 7, is composed of a differential pressure regulating valve 104a on an upper side thereof and a float valve 104b on a lower side thereof, and both ends of a communication hole 104c disposed on an upper portion of the fuel tank 102 serve as seat surfaces, opening and closing states of the communication hole 104c being enabled to be controlled by a diaphragm 104d and a float 104e.

In addition, in order to illustrate the operation of the differential pressure regulating valve 104a and the float valve 104b on the lower side of the device, a state, in which the differential pressure regulating valve 104a is opened and the float valve 104b is closed, is shown on a left side of an axis A1—A1 of the fuel vapor discharge device 104 in FIG. 7, and a state, in which the differential pressure regulating valve 104a is closed and the float valve 104b is opened, is shown on a right side of the axis.

In order to actuate the diaphragm 104d of the differential pressure regulating valve 104a, there are provided chambers 104f, 104g partitioned by the diaphragm 104d. Connected to the chamber 104f is a signal line 106 extended from a midway of the loading arm 103, and introduced into the chamber 104g through the communication hole 104c is pressure in the fuel tank 102 (when the diaphragm 104d is opened), a vent line 108 being connected to a canister 107.

With the float valve 104b of the fuel vapor discharge device 104, when a liquid level rises and the device inclines/ tumbles, the float 104e floats to close the communication hole 104c, thus enabling preventing a fuel from leaking from the fuel tank 102.

Connected to the fuel shut-off valves 105a, 105b is an evaporative line 109 (vaporized fuel passage) for preventing an increase in internal pressure in the fuel tank 102, the evaporative line 109 being communicated to the canister 107. The evaporative line 109 is closed by floats 105c, 105d at the time of turning/fluctuation in running.

The provision of the two fuel shut-off valves 105a, 105b enables internal pressure in the fuel tank 102 to escape through one of the fuel shut-off valves even if the other of the fuel shut-off valves is closed when a vehicle inclines.

A check valve 110 is provided on the evaporative line 109 to prevent a fuel from flowing directly into the canister 107 or a reservoir chamber possibly provided between the check valve 110 on the evaporative line 109 and the canister 107, the reservoir chamber being not shown. Pressure, at which the check valve 110 is opened, is set low in order to prevent an increase in internal pressure in the fuel tank 102.

Also, a test line 111 is provided on the evaporative line 109 to bypass the check valve 110, and a solenoid valve 112 is provided midway the test line 111 to open and close the test line 111.

The canister 107 is connected to a scavenging means 113 to be able to feed the absorbed fuel vapor to a side of an engine E for burning.

With the conventional fuel vapor drain control system 101 constructed in the above manner, the differential pressure regulating valve 104a is opened by a difference between pressure in the tank and outside air pressure (the signal line 106) at the time of feed, so that a gas (mainly, air and fuel vapor) in the fuel tank 102 is absorbed by the canister 107 via the vent line 108.

When the tank becomes full, the float valve 104b is closed to shut-off the vent line 108, thus temporarily increasing internal pressure in the tank to raise a liquid level (a liquid level indicated by H in FIG. 6) in the loading arm 103 to actuate the automatic stopping function of an oil filler gun G.

With the above fuel vapor drain control system 101, however, the float valve 104b shifts to a closed state from an opened state at a stroke in that closing action of the float valve 104b of the fuel vapor discharge device 104, which is caused by the ascent of a liquid level at the time of feed, so that internal pressure in the tank rapidly increases to excessively raise a liquid level (a liquid level indicated by H1 in FIG. 6) in the loading arm 103.

In this state, since even when the float valve 104b is put in a closed state, the fuel shut-off valves 105a, 105b cause internal pressure in the fuel tank 102 to gradually escape, the liquid level lowers after the lapse of some time to dissolve the above excessive ascent but the liquid level (H1) temporarily approaches the fill opening 103a.

With a view to solving such problem, the fuel vapor discharge device 104 in some cases comprises a configuration, as shown in FIG. 8, which throttles the flow rate of a gas discharged prior to closing of the float valve 104b to gradually raise internal pressure in the tank. In addition, in order to illustrate the operation of a flowrate throttle member 104h and the float valve 104b, a state, in which the float valve 104b is opened and the flowrate throttle member 104h throttles the flow rate, is shown on a left side of an axis A2—A2 of the fuel vapor discharge device 104 in FIG. 8, and a state, in which the float valve 104b is opened and the flowrate throttle member 104h does not throttle the flow rate, is shown on a right side of the axis.

In FIG. 8, the flowrate throttle member 104h is provided above and connected to the float 104e by a spring 104i. Normally, a fuel vapor is discharged from two discharge holes 104j, 104k, and when the float valve 104b rises as a liquid level ascends at the time of feed, the flowrate throttle member 104h closes one 104j of the discharge holes prior to closing of the float valve 104b to throttle the flow rate of fuel vapor as discharged, and finally the float 104e closes the other 104k of the discharge holes.

With the configuration shown in FIG. 8, however, the spring 104i is provided between the flowrate throttle member 104h and the float 104e, whereby a position in the fuel vapor discharge device 104, in which the float 104e is mounted, is lowered, and so a liquid level is lowered when the fuel tank 102 becomes full at the time of closing of the float valve 104b, thereby causing a problem that it is not possible to enlarge a full-tank capacity.

Also, with a conventional fuel vapor drain control system 101' shown in FIG. 9, an evaporative line 109 provided with a two-way valve for preventing an increase in internal pressure in a fuel tank 102 is connected to a canister 107 from one fuel shut-off valve 105. With the fuel vapor drain control system 101' shown in FIG. 9, when fuel enters into the evaporative line 109 from the fuel shut-off valve 105 at the time of turning/fluctuation in running, it is feared that the fuel having once entered remains in the evaporative line 109 to be shut-off from escape and finally passes through the two-way valve to flow to the canister 107.

The present invention solves the above problems of the conventional art, and has its object to suppress or prevent a liquid level in a loading arm to excessively ascend (in some cases, a fuel possibly spills) in a full-tank state with feed.

DISCLOSURE OF THE INVENTION

The invention provides a liquid shut-off valve device provided with a float valve including a float provided in an upper portion of a sealed container, which receives therein a liquid, and moved according to a liquid level position of the liquid supplied into the sealed container, and an open-close valve for closing a discharge path, which discharges a gas in the sealed container, when the float rises to a predetermined position corresponding to the ascent of a liquid level position, the liquid shut-off valve device characterized by flowrate throttle means having a pressure receiving portion receiving as an urge flow or pressure of a gas moving to the discharge path from within the sealed container, a recess projecting above the pressure receiving portion to be hollowed downward to be opened to an underside of the pressure receiving portion, and a flowrate throttle path, the flowrate throttle means moving independently of the float, when the pressure receiving portion is urged prior to closing of the float valve, to cause the gas in the sealed container to be discharged to the discharge path through the flowrate throttle path to throttle a flowrate of the gas moving to the discharge path from within the sealed container, and a connection mechanism provided in the recess of the flowrate throttle means to connect the flowrate throttle means to the float movably in a predetermined range.

When a liquid level in the sealed container rises above a predetermined level, the float valve is closed, but the flowrate throttle means throttles a flow rate of a gas discharged from the discharge path prior to closing of the float valve whereby it is possible to gradually raise pressure in the sealed container prior to closing of the float valve, thus enabling suppressing rapid pressure variation and excessive pressure possibly caused by closing of the float valve at a stroke.

In this manner, by stabilizing pressure variation in the sealed container, it is possible to stabilize an increase in liquid level in a liquid supplying section (loading arm), which is provided on the sealed container, when the float valve is closed.

Since the flowrate throttle means is movable independently of the float, pressure (suction pressure) applied on the flowrate throttle means due to movements of a gas is suppressed in transmission to the float, so that influence on the behavior of the float put in an unstable state (a state, in which closing is caused in a mere occasion) when the float valve approaches a closed state is suppressed, thus enabling suppressing rapid pressure variation and excessive pressure possibly caused by closing of the float valve at a stroke.

A recess of the flowrate throttle means is hollowed downward to enlarge a pressure receiving area, at which the flowrate throttle means is subjected to the urge of flow or pressure of a gas inside the recess, so that the flowrate throttle means is subjected to the urge to become liable to move. Also, since no liquid accumulates in the recess and the flowrate throttle means is not changed in weight, the response characteristic of the flowrate throttle means moved by the urge is made invariably stable. Further, the recess is sealed except an opening thereof to eliminate leakage of a gas, thus causing no change in the flow rate of a gas passing therethrough at the time of throttle.

Meanwhile, the connection mechanism is able to movably connect the flowrate throttle means to the float, thus enabling forcibly returning the flowrate throttle means together with fall of the float caused by lowering of a liquid level of a liquid even in the event of adherence of the flowrate throttle means having risen.

Also, since the connection mechanism is provided in the downwardly hollowed recess of the flowrate throttle means, the connection mechanism is free from contact with a liquid to be able to prevent dust or the like contained in the liquid from adhering to the connection mechanism, so that the flowrate throttle means can move smoothly through the connection mechanism independently of the float.

Further, since the connection mechanism is provided in the recess, which projects above the pressure receiving portion, and nothing is interposed between the flowrate throttle means and the float, that position in the device, in which the float is mounted, can be made high in level, and a full-tank liquid level in the sealed container when the float valve is closed becomes high, thus enabling increasing a full-tank capacity.

Preferably, the flowrate throttle means is provided with a guide member, which is provided on an upper surface of the pressure receiving portion to slide with an inner wall of the device as a guide surface.

Thereby, the flowrate throttle means movably supported by the guide member is made stable in posture at the time of movement and so it is possible to stably actuate the flowrate throttle means.

When the pressure receiving portion is not urged, the flowrate throttle means causes the underside of the pressure receiving portion to abut against the upper surface of the float to move together with the float, the underside of the pressure receiving portion is defined by a tapered surface, of which center is inclined downward, and the upper surface of the float is preferably planar.

Thereby, a contact area between the underside of the pressure receiving portion and the upper surface of the float is reduced to enable preventing the flowrate throttle means from adhering to the float. Also, it is possible to provide a gap between the float and the pressure receiving portion in a state, in which the underside of the pressure receiving portion abuts against the upper surface of the float, so that urge can be well applied on the underside of the pressure receiving portion.

Preferably, the connection mechanism comprises a stopper provided inside the recess, and a projection having a top, which is held in the recess by the stopper to be movable vertically in a predetermined range in the recess, and extending upward from an upper portion of the float.

Thereby, the flowrate throttle means can move in a predetermined range independently of the float.

Preferably, there are comprised of a chamber provided above the float valve and the flowrate throttle means, an opening in the chamber with the discharge path opened upward, a communication passage connecting the chamber, and valve means provided in the upper portion of the sealed container to be disposed above the chamber and the device.

Thereby, in the case where a liquid enters above the float valve and the flowrate throttle means when the sealed container inclines, the chamber accumulates a predetermined amount of the liquid to enable preventing entry of the liquid into the discharge path. Also, since the opening of the discharge path is opened upward, the liquid accumulated in the chamber does not enter into the discharge path. Further, the liquid having entered in a communication passage from the valve means can be recovered into the sealed container from the chamber.

BRIEF DESCRIPTION OF DRAWINGS

FIGS. 3a, 3b and 3c are views illustrating the action of the fuel vapor drain device according to the embodiment at the time of feed;

BEST MODE FOR CARRYING OUT THE INVENTION

Figure 5:
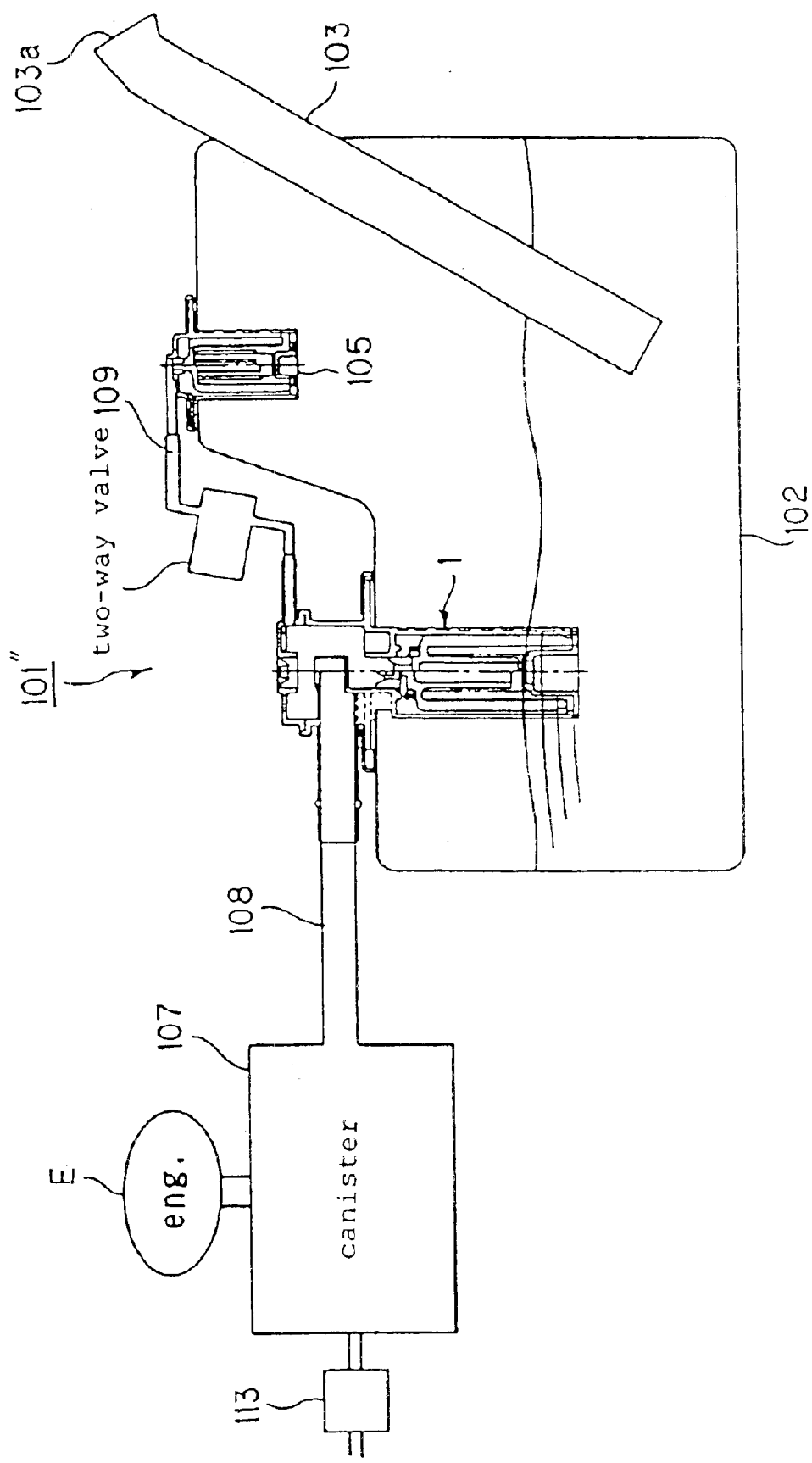
FIG. 5 is a view showing a fuel vapor drain control system provided with the fuel vapor drain device according to the embodiment.

An explanation will be given below to a constitution of a fuel vapor drain control system 101" according to an embodiment with reference to FIG. 5. FIG. 5 is a view illustrating a schematic constitution of the fuel vapor drain control system 101" for controlling a fuel vapor (referred below to as vapor containing a mixed gas of air and a vaporized fuel) in a fuel tank 102 according to the embodiment, in an automobile provided with an engine, in which gasoline, gas oil or the like is used as fuel.

In FIG. 5, 102 denotes a fuel tank, and 103 a loading arm having a fill opening 103a and extending into the fuel tank 102. Arranged above the fuel tank 102 are a fuel vapor discharge device 1 for preventing excessive feed at the time of feed and a fuel shut-off valve 105 disposed in a higher level than the fuel vapor discharge device 1.

Connected to the fuel shut-off valve 105 is an evaporative line 109 provided with a two-way valve for preventing an increase in internal pressure in the fuel tank 102. The evaporative line 109 is closed by a float in the fuel shut-off valve 105 at the time of turning/fluctuation in running.

The evaporative line 109 extending from the fuel shut-off valve 105 leads to the fuel vapor discharge device 1 described later in detail. Also, connected to the fuel vapor discharge device 1 is a vent line 108 communicated to the canister 107.

The canister 107 is connected to a scavenging means 113 to be able to feed the absorbed fuel vapor to a side of an engine E for burning.

Figure 1:
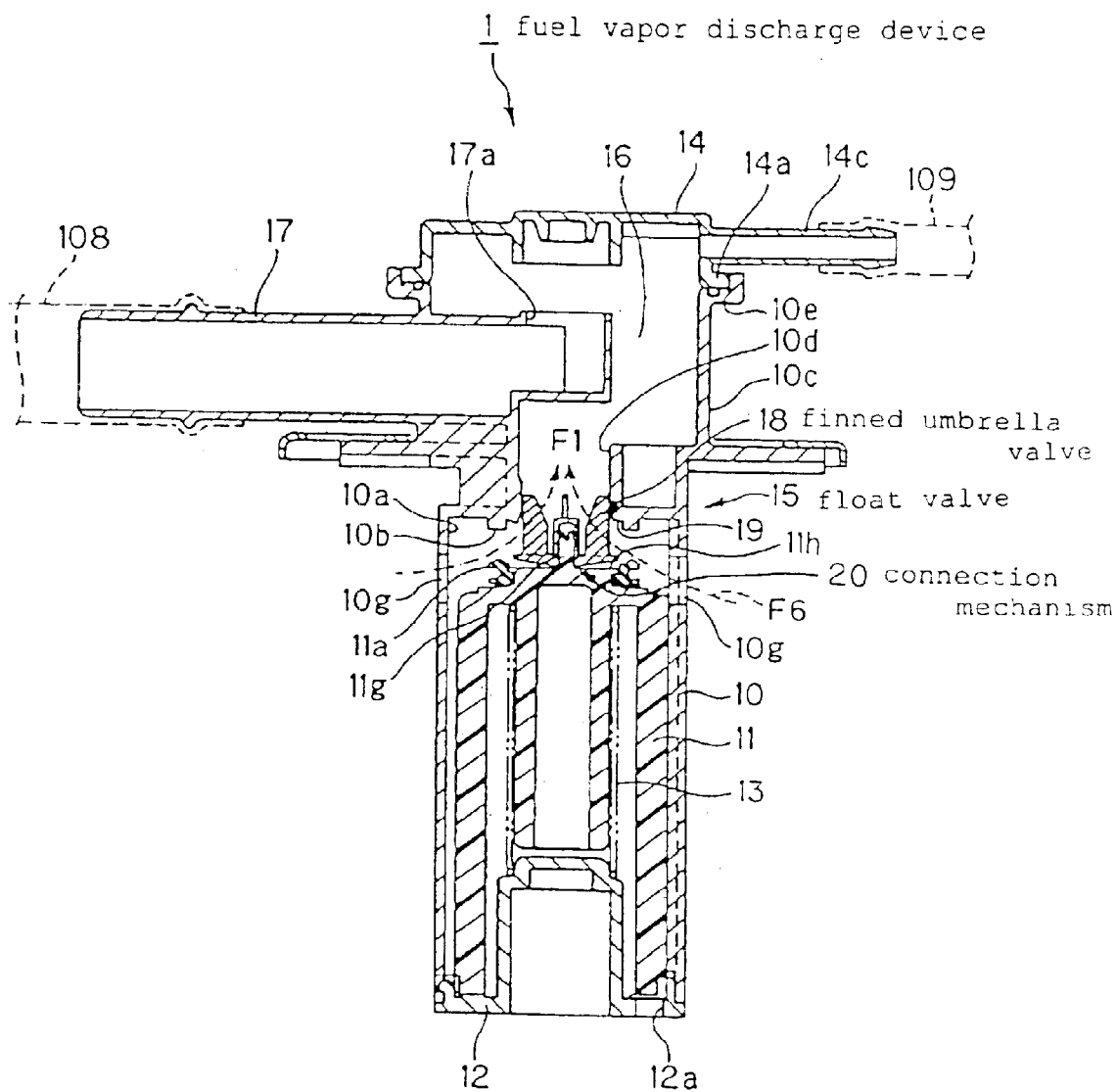
FIG. 1 is a schematic, cross sectional view showing a fuel vapor drain device according to an embodiment.

Subsequently, an explanation will be given to the fuel vapor discharge device 1 as a liquid shut-off valve device according to the embodiment with reference to FIG. 1. FIG. 1 is a view illustrating a cross sectional constitution of the fuel vapor discharge device 1 according to the embodiment.

In FIG. 1, 10 denotes a casing member, an interior of which defines a float chamber 10a receiving a float 11.

The float 11 is given buoyancy by a fuel as a liquid flowing into the float chamber 10a through a communication hole 12a (and a vent hole 10g above the float chamber 10a) in a cap 12 mounted on a lower end of the casing member 10, the float moving upward in a state shown in the figure.

Figure 2A:
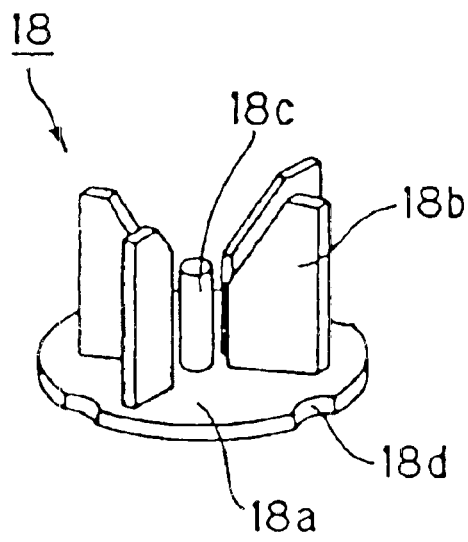
FIGS. 2a, 2b and 2c are views showing a finned umbrella valve according to the embodiment.
Figure 2B:
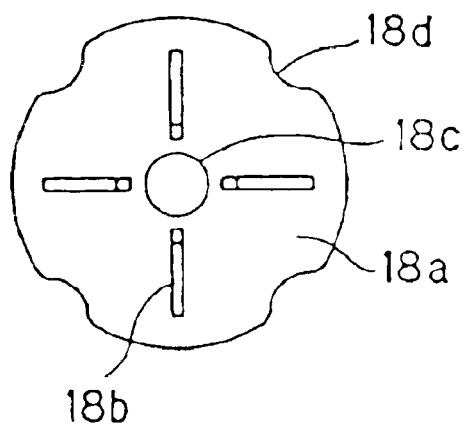
Figure 2C:
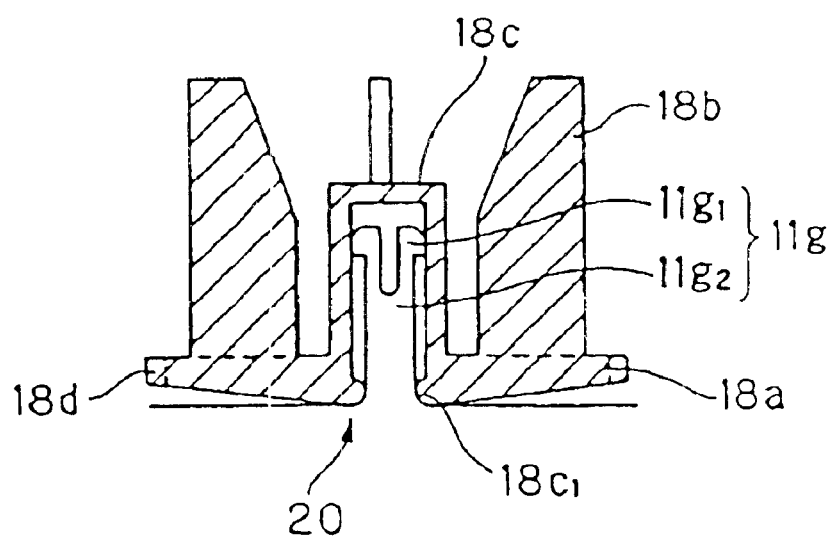

Provided on a top of the float 11 to project upward is a projection 11g, of which top 11g1 is larger in diameter than a small-diameter portion 11g2 at a root (see FIG. 2(c) for details).

Provided on an upper portion of the float 11 is a float packing 11a as an annular seal-shaped valve body, which exhibits a sealing property, and provided above the float chamber 10a is a valve seat portion 10b as an annular valve seat corresponding to the float packing 11a. In addition, the float packing 11a and the valve seat portion 10b constitute an open-close valve, and the open-close valve and the float 11 constitute in combination a float valve 15.

Also, 13 denotes a spring functioning as urge means for adjusting buoyancy of the float 11. The spring 13 constantly urges the float 11 with a smaller load than the self-weight of the float 11 but does not push up the float 11 to close the float valve 15 at the time of being erect as far as no buoyancy acts.

The valve seat portion 10b constitutes an end of a cylindrical-shaped vent portion 10c. Provided inside the vent portion 10c in a predetermined level is a guide surface 10d being a device inner-wall extending upward from the valve seat portion 10b, and the guide surface 10d and the vent portion 10c define therebetween a sealed space to prevent entry of a fuel. Also, the vent portion 10c is provided on the other end thereof with a flange end 10e, which fits on a flange end 14a of an upper cap 14.

Figure 4:
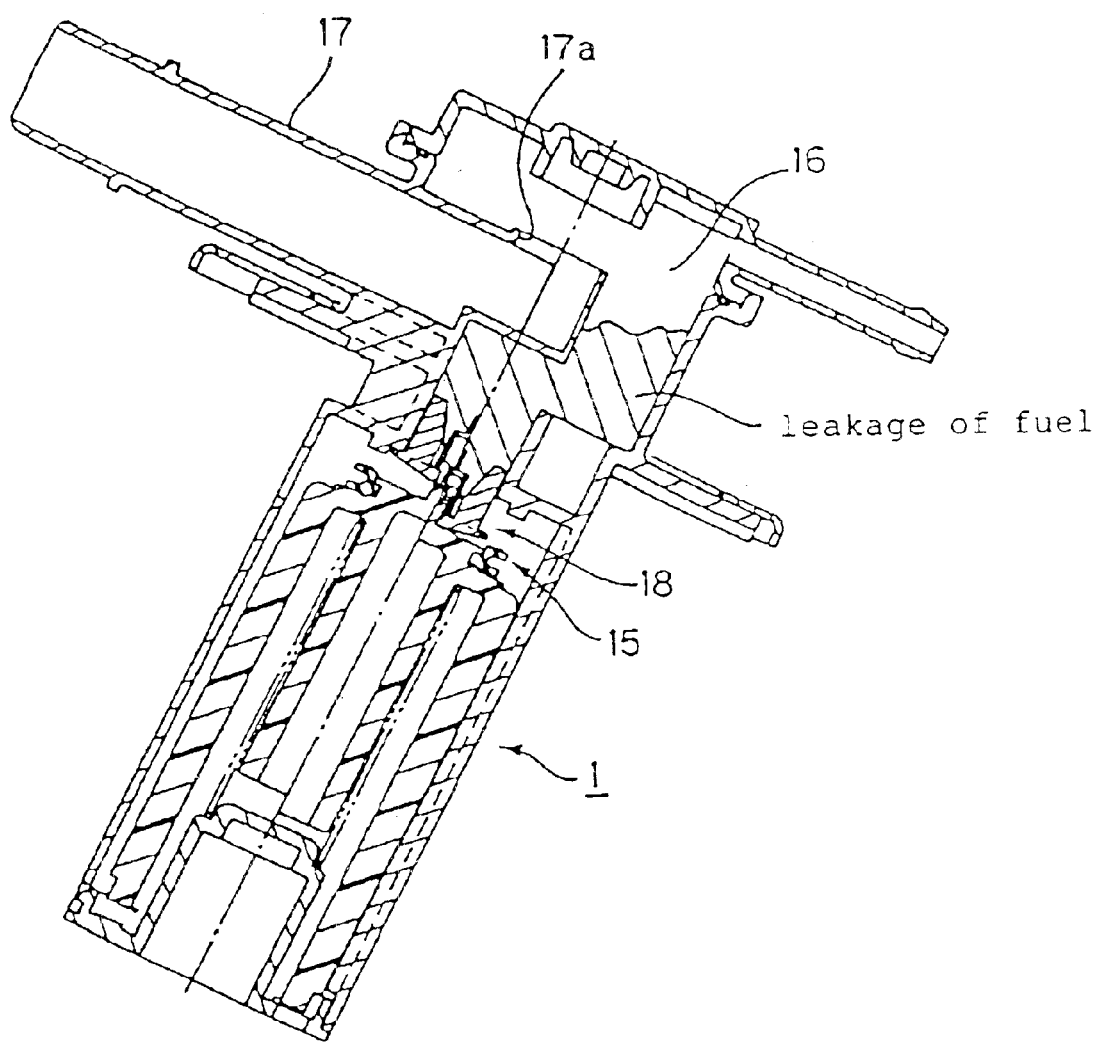
FIG. 4 is a view illustrating a state, in which a fuel is accumulated in a chamber, in the fuel vapor drain device according to the embodiment.

The vent portion 10c and the upper cap 14 provide a chamber 16 having a predetermined space above the float valve 15. In the case where a fuel enters above the float valve 15 when the fuel tank 102 inclines as shown in FIG. 4, the chamber 16 accumulates a predetermined amount of fuel to prevent entry of the fuel into a discharge path.

The upper cap 14 is provided with a port 14c, through which an evaporative line 109 leading from the fuel shut-off valve 105 is connected to the chamber 16 (see FIG. 5). Therefore, a fuel entering into the evaporative line 109 from the fuel shut-off valve 105 is finally delivered to the chamber 16 through the two-way valve to be again recovered into the fuel tank 102. Therefore, a problem in the conventional arrangement is solved that a fuel having entered into the evaporative line 109 from the fuel shut-off valve 105 flows to the canister 107.

Also, opened upward to the chamber 16 is an opening 17a of a discharge port 17 (connected to a vent line 108) extending through the casing member 10. Therefore, when a fuel is accumulated in the chamber 16, the fuel does not enter into the upwardly opened opening 17a, so that it is possible to prevent the fuel from flowing to the canister 107 through the vent line 108.

In this manner, the fuel vapor discharge device 1 is provided midway the discharge path (the vent line 108), through which a fuel vapor is discharged from the fuel tank 102, to serve to discharge to the vent line 108 a fuel vapor in the fuel tank 102 at the time of feed or the like.

More specifically, the float 11 is not given buoyancy by a fuel and disposed in a lower position in a state shown in FIG. 1, and when internal pressure in the fuel tank 102 is increased at the time of feed or the like, a fuel vapor passes through a shut-off valve, which is defined between the float packing 11a and the valve seat portion 10b, in an opened state to flow into the chamber 16 to be able to flow to the vent line 108 from the opening 17a of the discharge port 17 opened to the chamber 16.

Here, the fuel vapor discharge device 1 according to the embodiment is provided above the float 11 with a finned umbrella valve 18 as flowrate throttle means.

FIG. 2 shows the finned umbrella valve 18 in detail, FIG. 2(a) being a perspective view, FIG. 2(b) being a plan view, and FIG. 2(c) being a cross sectional view.

The finned umbrella valve 18 comprises a flowrate restricting portion 18a serving as a pressure receiving portion and extending in a flanged manner, fins 18b (four in number in the embodiment) as a guide member provided on an upper surface of the flowrate restricting portion 18a to slide on the guide surface 10d extending upward from the valve seat portion 10b, and a recess 18c projecting from the upper surface of the flowrate restricting portion 18a in a columnar manner and hollowed downward to be opened to an underside of the flowrate restricting portion 18a so as to hold and receive the projection 11g formed on the upper side of the float 11.

The flowrate restricting portion 18a is disk-shaped and includes an underside in the form of a tapered surface inclined downward at about 10 degrees toward a center thereof from outside, the flowrate restricting portion receiving as urge forces flow (a dotted arrow F1) and pressure when a fuel vapor passes toward the guide surface 10d from the vent hole 10g provided on an upper portion of a peripheral wall of the float chamber 10a, and moving upward in the case where the urge forces exceed the weight of the finned umbrella valve 18 (the float 11 floats upward a little whereby the urge forces on the underside of the flowrate restricting portion 18a increase).

A bearing seat 11h on the upper surface of the float 11, on which the projection 11g is provided, is flat and substantially planar to suppress accumulation of a fuel to the minimum. Also, a gap is provided between the bearing seat 11h and the inclined underside of the flowrate restricting portion 18a when the finned umbrella valve 18 is seated on the float 11, thus limiting a contact area between the finned umbrella valve 18 and the float 11 to the minimum, inhibiting the finned umbrella valve 18 from adhering to the float 11, making it easy for the underside of the flowrate restricting portion 18a to bear the urge forces when the finned umbrella valve 18 is seated on the float 11, and making it easy for the finned umbrella valve 18 to float.

The fins 18b are so long as to slide on the guide surface 10d to be guided even when the float 11 is disposed in a lowermost position, and set to a thickness of 0.7 mm so as to prevent adhering to the guide surface 10d and permit smooth discharge of a fuel vapor as indicated by the dotted arrow F1.

The thickness of 0.7 mm is suitable for ensuring rigidity of the fins 18b, lightening and preventing adherence. In addition, the fins 18b are not limited to a trapezoid in shape as in the embodiment but can be rectangular-shaped, triangular-shaped or rod-shaped or annular-shaped as far as they can slide on the guide surface 10d.

An edge of the flowrate restricting portion 18a extends outside beyond an outer peripheral diameter defined by the fins 18b, and an upper surface of the edge abuts against an annular bearing seat 19 provided on an inner periphery of the valve seat portion 10b when the flowrate restricting portion 18a moves upward.

Further, the edge of the flowrate restricting portion 18a is provided at an outer periphery thereof with notches 18d (four in number in the embodiment), which are arcuately cut out to function as flowrate throttle paths. The notches 18d are set to such a size that a fuel vapor discharged from the fuel tank 102 can be canalized in a throttled flowrate even in a state, in which the edge of the flowrate restricting portion 18a abuts against the annular bearing seat 19.

In addition, the flowrate throttle paths can be variously modified as by providing through holes on the flowrate restricting portion 18a.

Figure 6:
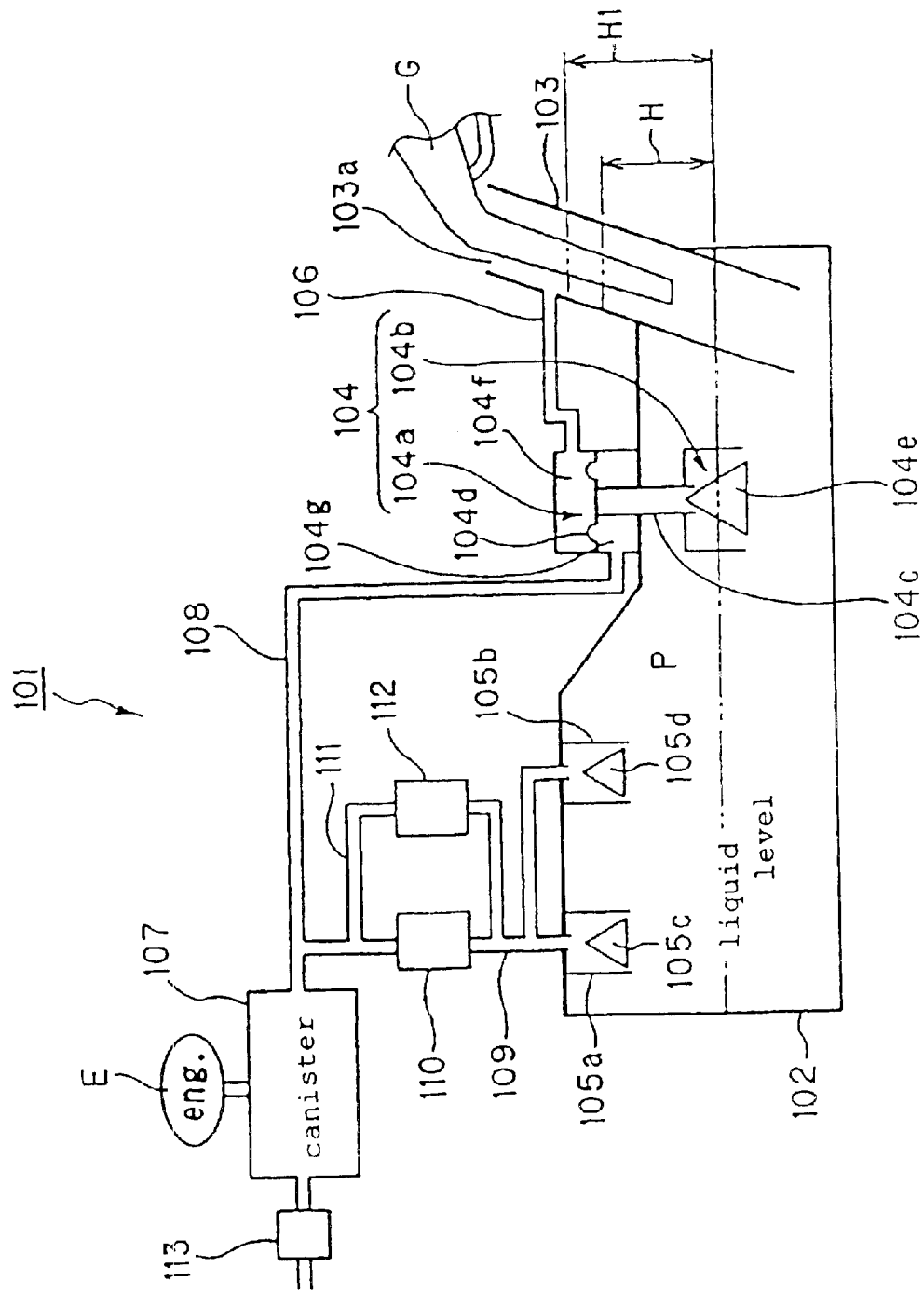
FIG. 6 is a view showing a fuel vapor drain control system provided with a conventional fuel vapor drain device.
Figure 7:
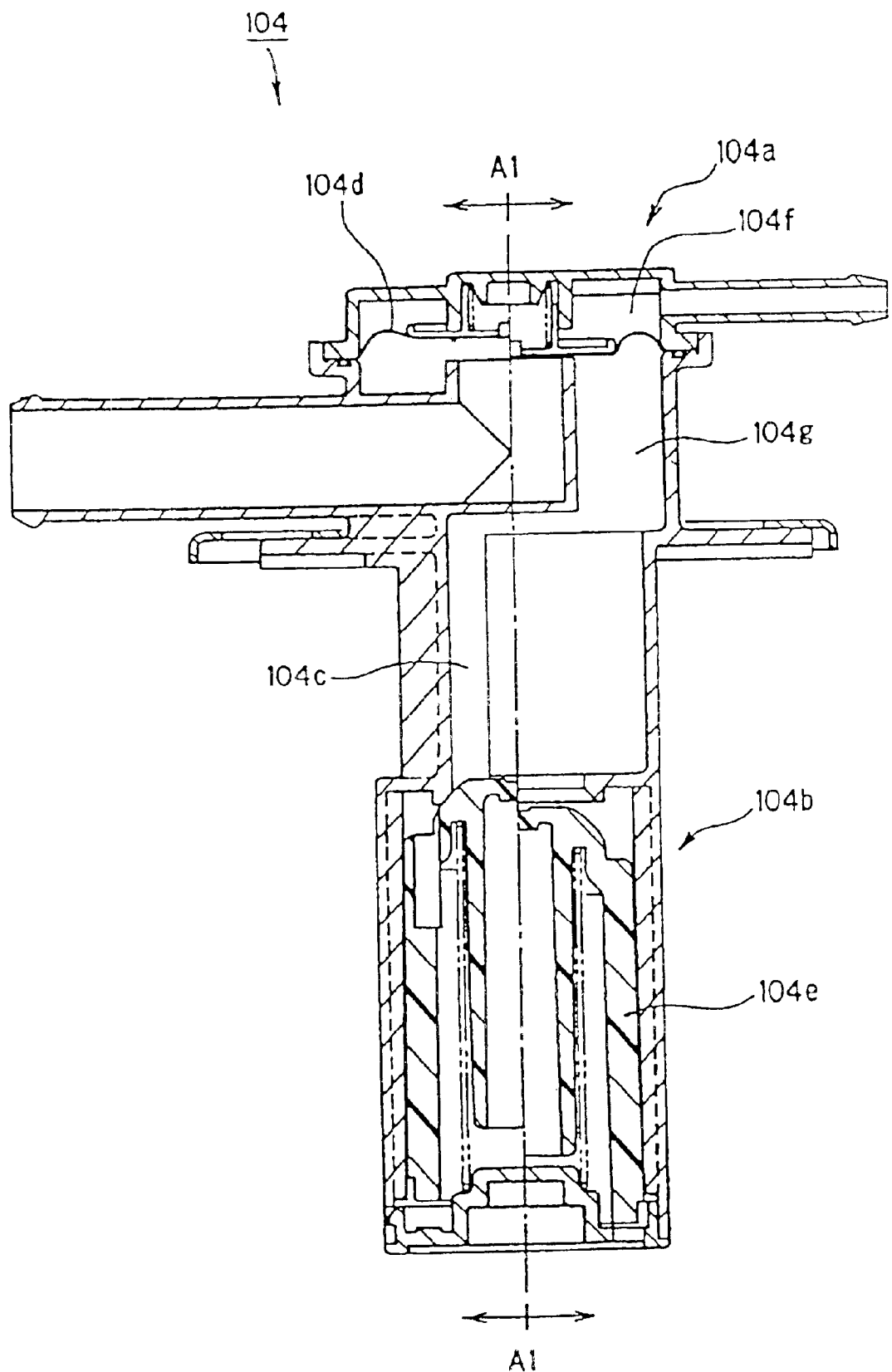
FIG. 7 is a schematic, cross sectional view showing a conventional fuel vapor drain device.
Figure 8:
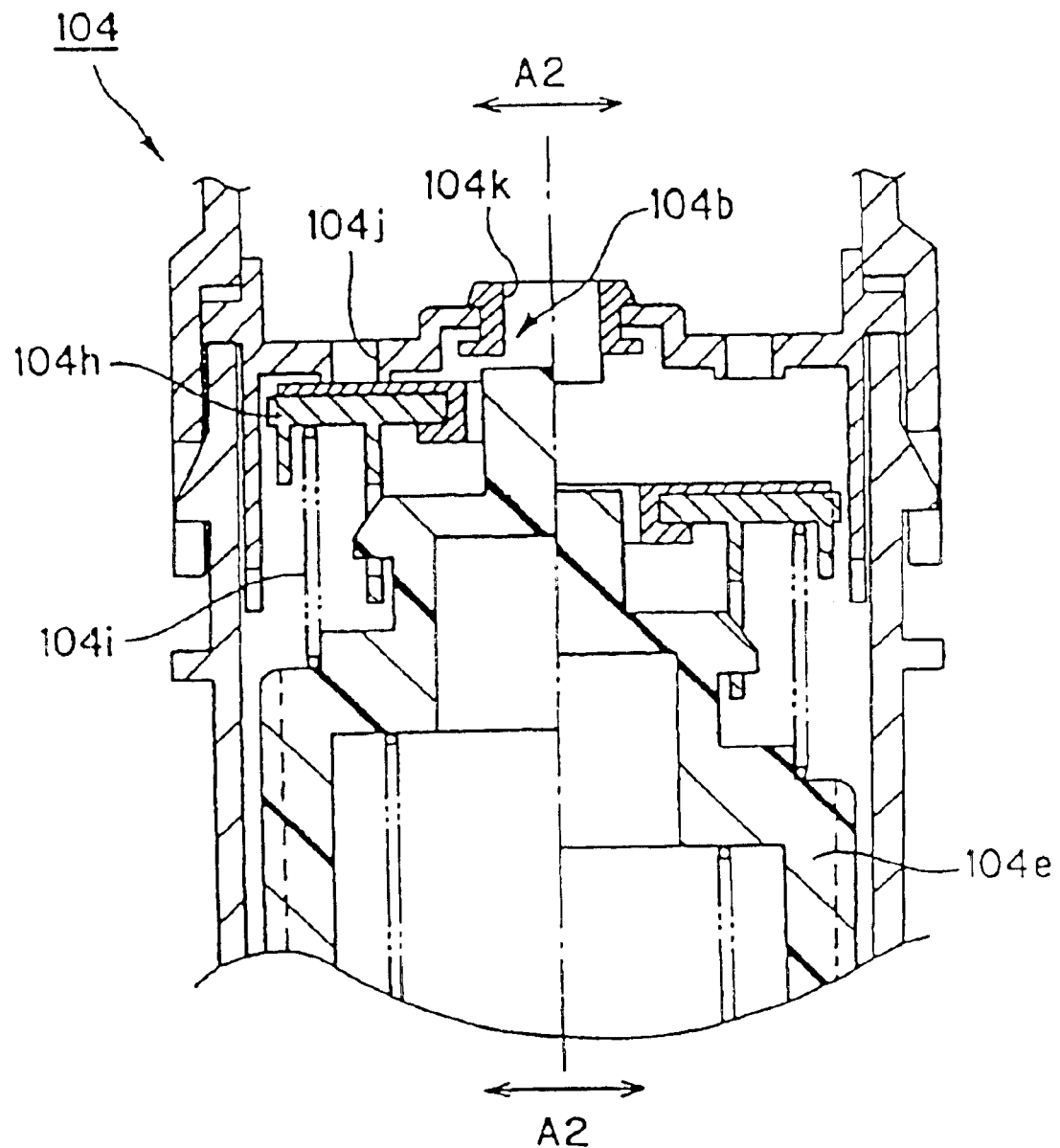
FIG. 8 is a schematic, cross sectional view showing an essential part of the conventional fuel vapor drain device in enlarged scale.
Figure 9:
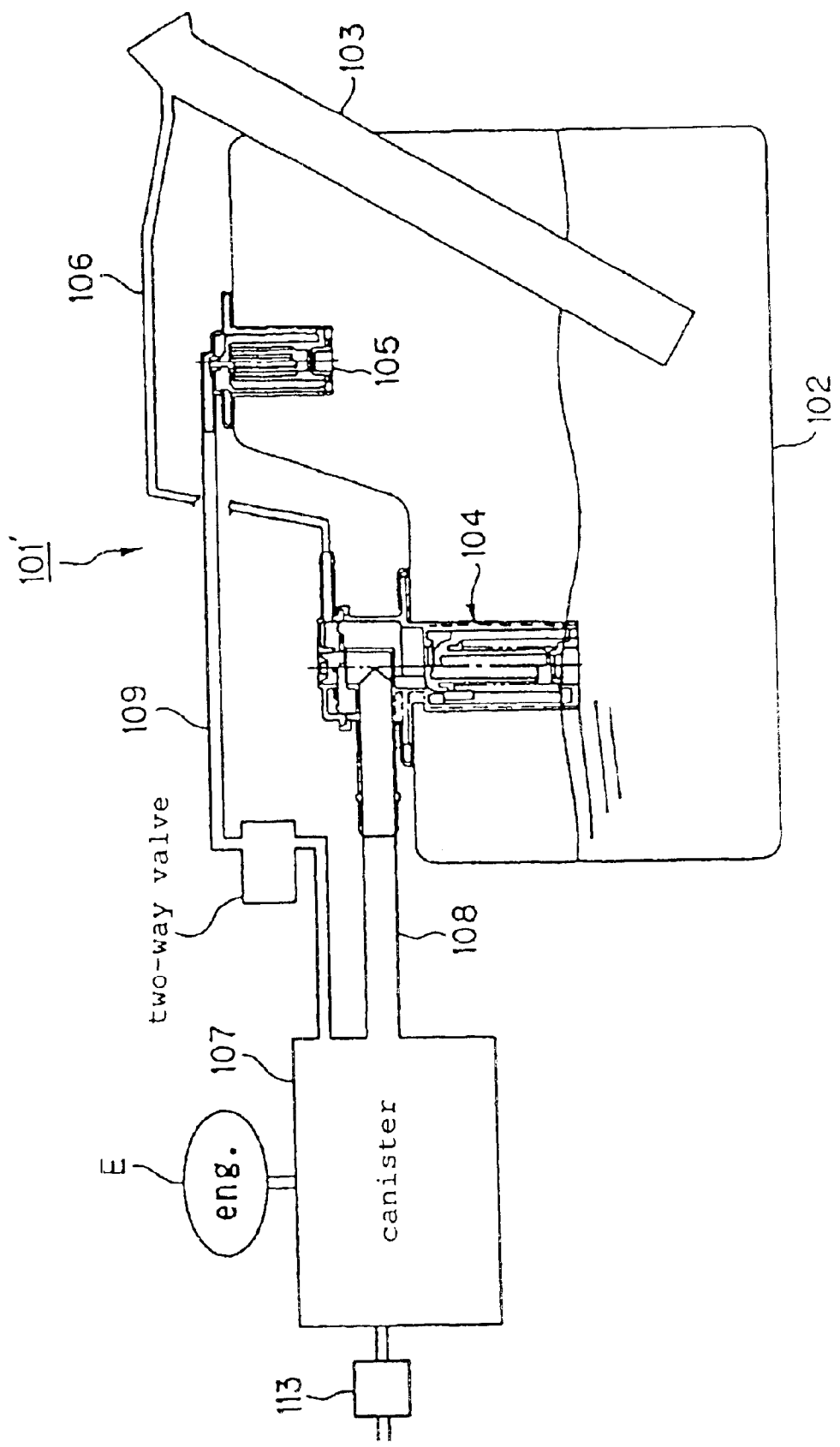
FIG. 9 is a view showing a fuel vapor drain control system provided with a conventional fuel vapor drain device.

An amount of throttle in the notches 18d is set such that pressure in the fuel tank 102 is increased to a pressure for actuating the automatic stopping function of the oil filler gun G, that is, internal pressure in the fuel tank 102 is temporarily increased to raise a liquid level (a liquid level indicated by H in FIG. 6) in the loading arm 103.

The recess 18c is provided centrally of the upper surface of the flowrate restricting portion 18a and permits the projection 11g on an upper portion of the float 11 to be inserted thereinto. An opening 18c1 of the recess 18c has a smaller diameter than an inner diameter of the recess 18c and serves as a stopper for holding the top 11g1 of the projection 11g in the recess 18c.

Therefore, the top 11g1 is movable in a predetermined range (in a vertical direction) in the recess 18c whereby the finned umbrella valve 18 is connected to the float 11 to be movable in a predetermined range (in a vertical direction). That is, the opening 18c1 and the top 11g1 constitute a connection mechanism 20, which movably connects the finned umbrella valve 18 to the float 11.

And since the connection mechanism 20 is provided in the recess 18c, the connection mechanism 20 is free from contact with a fuel to be able to prevent dust or the like contained in a fuel from adhering to the connection mechanism 20, so that the finned umbrella valve 18 can move smoothly at all times through the connection mechanism 20 independently of the float 11.

Subsequently, an explanation will be given to the action of the finned umbrella valve 18 with reference to FIG. 3 (since the symmetrical configuration is shown therein, a left side around the finned umbrella valve 18 in FIG. 1 is omitted, and only a right side portion is shown).

FIG. 3(*a*) shows a state prior to feed and an initial stage during feed (not a full-tank state), the float 11 being disposed in a lower portion of the float chamber 10*a* since a liquid level is low. Also, the finned umbrella valve 18 does not act but is seated on the bearing seat 11*h* on the upper surface of the float 11 to move integrally with the float 11. In a state shown in FIG. 3(*a*), the float valve 15 ensures a sufficient flow passage not interfering with the quality of feed, which permits rapid discharge of a fuel vapor as indicated by the dotted arrow F1.

FIG. 3(*b*) shows a state, in which feed proceeds to approach a full-tank state, the float 11 being given buoyancy, and the float valve 15 approaching a closed state. In this state, a flow (dotted arrow F2) of a fuel vapor discharged and a differential pressure generated due to entry of a fuel vapor below the flowrate restricting portion 18*a* cause the flowrate restricting portion 18*a* to be subjected to an urge, so that with the finned umbrella valve 18, the flowrate restricting portion 18*a* moves in a discharge direction of fuel vapor (upward in FIG. 3) to abut against the annular bearing seat 19.

Since the fins 18*b* move along the guide surface 10*d* when the finned umbrella valve 18 moves, the finned umbrella valve 18 is preserved in posture and not inclined. Also, after the flowrate restricting portion 18*a* abuts against the annular bearing seat 19, a fuel vapor is canalized through the notches 18*d*, which are kept in flow passage diameter, so that discharge of the fuel vapor can be effected in a more stable throttled state.

In this manner, the finned umbrella valve 18 moves to throttle the flow passage diameter of the fuel vapor. Since throttling is effected, pressure in the fuel tank 102 can be gradually increased prior to closing of the float valve 15, which can suppress rapid pressure variation and excessive pressure possibly caused by closing of the float valve 15 at a stroke.

Since the finned umbrella valve 18 moves independently of the float 11, pressure (suction pressure) applied on the throttle member due to discharge of a fuel vapor is suppressed in transmission to the float 11.

Accordingly, influence on the behavior of the float valve 15 put in an unstable state (a state, in which closing is caused in a mere occasion) when the float valve 15 approaches a closed state is suppressed.

When pressure in the fuel tank 102 is increased and the automatic stopping function of the oil filler gun G is once actuated to stop feed, discharge of a fuel vapor gradually eliminated, so that no urge is applied on the flowrate restricting portion 18*a* of the finned umbrella valve 18 and the finned umbrella valve 18 falls to be returned to a state without throttle.

In a state shown in FIG. 3(*b*), discharge of a fuel vapor accompanying feed of a fuel is possible at a throttled flowrate of discharge, and so additional feed is possible.

When a feed rate is increased in the additional feed, the finned umbrella valve 18 will react to cause an immediate increase in pressure in the fuel tank 102 and actuation of the automatic stopping function of the oil filler gun G, but when the feed rate is decreased to feed a fuel in small amounts, the reaction of the finned umbrella valve 18 is weakened.

FIG. 3(*c*) shows a state, in which the float valve 15 is fully closed, and when the additional feed is continued from the state shown in FIG. 3(*b*), the float valve 15 is put in a fully closed state as shown in FIG. 3(*c*).

In addition, when fuel is consumed and a liquid level is lowered, the float 11 is naturally lowered in level. When the float 11 falls, the top 11*g*1 of the projection 11*g* remaining in the recess 18*c* is caught by a stopper of the opening 18*c*1 of the recess 18*c*, and so the finned umbrella valve 18 together with the float 11 falls. Therefore, even if the finned umbrella valve 18 adheres to the annular bearing seat 19, such adherence is dissolved.

The states shown in FIGS. 3(*a*), 3(*b*) and 3(*c*) can be represented together in TABLE 1. Liquid level indicates a distance from an inner wall surface on an upper portion of the fuel tank 102, the finned umbrella valve 18 is abridged as finned valve, and the float valve 15 is abridged as float.

TABLE 1

| FIG. 3 | (a) | (b) | (c) |
| --- | --- | --- | --- |
| Liquid level | — | 33.5 mm | 28.0 mm |
| Finned valve | OPEN | CLOSE | CLOSE |
| Float | OPEN | OPEN | CLOSE |
| Flowrate of air | 45 L/min | 15 L/min | 0 L/min |

Opened and closed states of the finned umbrella valve 18 and the float valve 15 are indicated by OPEN/CLOSE, and the discharge flowrate of a fuel vapor is 45 L/min in a state (a) and 15 L/min in a state (b).

INDUSTRIAL APPLICABILITY

In the invention described above, when a liquid level in a sealed container rises above a predetermined level, a float valve is closed, but a flowrate throttle means throttles a flow rate of a gas discharged from a discharge path prior to closing of the float valve whereby it is possible to gradually raise pressure in the sealed container prior to closing of the float valve, thus enabling suppressing rapid pressure variation and excessive pressure possibly caused by closing of the float valve at a stroke.

In this manner, by stabilizing pressure variation in the sealed container, it is possible to stabilize an increase in liquid level in a liquid supplying section (loading arm), which is provided on the sealed container, when the float valve is closed.

Since the flowrate throttle means is movable independently of the float, pressure (suction pressure) applied on the flowrate throttle means due to movements of a gas is suppressed in transmission to the float, so that influence on the behavior of the float put in an unstable state (a state, in which closing is caused in a mere occasion) when the float valve approaches a closed state is suppressed, thus enabling suppressing rapid pressure variation and excessive pressure possibly caused by closing of the float valve at a stroke.

A recess of the flowrate throttle means is hollowed downward to enlarge a pressure receiving area, at which the flowrate throttle means is subjected to the urge of flow or pressure of a gas inside the recess, so that the flowrate throttle means is subjected to the urge to become liable to move. Also, since no liquid accumulates in the recess and the flowrate throttle means is not changed in weight, the response characteristic of the flowrate throttle means moved by the urge is made invariably stable. Further, the recess is sealed except an opening thereof to eliminate leakage of a gas, thus causing no change in the flow rate of a gas passing therethrough at the time of throttle.

Meanwhile, a connection mechanism is able to movably connect the flowrate throttle means to the float, thus enabling forcibly returning the flowrate throttle means together with fall of the float caused by lowering of a liquid level of a liquid even in the event of adherence of the flowrate throttle means having risen.

Also, since the connection mechanism is provided in the downwardly hollowed recess of the flowrate throttle means, the connection mechanism is free from contact with a liquid to be able to prevent dust or the like contained in the liquid from adhering to the connection mechanism, so that the flowrate throttle means can move smoothly through the connection mechanism independently of the float.

Further, since the connection mechanism is provided in the recess, which projects above the pressure receiving portion, and nothing is interposed between the flowrate throttle means and the float, that position in the device, in which the float is mounted, can be made high in level, and a full-tank liquid level in the sealed container becomes high, thus enabling increasing a full-tank capacity.

The flowrate throttle means is provided with a guide member, which is provided on an upper surface of the pressure receiving portion to slide with an inner wall of the device as a guide surface, so that the flowrate throttle means movably supported by the guide member is made stable in posture at the time of movement and so it is possible to stably actuate the flowrate throttle means.

When the pressure receiving portion is not urged, the flowrate throttle means causes the underside of the pressure receiving portion to abut against an upper surface of the float to move together with the float, the underside of the pressure receiving portion is defined by a tapered surface, of which center is inclined downward, and the upper surface of the float is planar, so that a contact area between the underside of the pressure receiving portion and the upper surface of the float is reduced to enable preventing the flowrate throttle means from adhering to the float. Also, it is possible to provide a gap between the float and the pressure receiving portion in a state, in which the underside of the pressure receiving portion abuts against the upper surface of the float, so that urge can be well applied on the underside of the pressure receiving portion.

The connection mechanism comprises a stopper provided inside the recess, and a projection having a top, which is held in the recess by the stopper to be movable vertically in a predetermined range in the recess, and extending upward from an upper portion of the float, so that the flowrate throttle means can move in a predetermined range independently of the float.

There are comprised of a chamber provided above the float valve and the flowrate throttle means, an opening in the chamber with the discharge path opened upward, a communication passage connecting the chamber, and valve means provided in the upper portion of the sealed container to be disposed above the device, so that in the case where a liquid enters above the float valve and flowrate throttle means when the sealed container inclines, the chamber accumulates a predetermined amount of the liquid to enable preventing entry of the liquid into the discharge path. Also, since the opening of the discharge path is opened upward, the liquid accumulated in the chamber does not enter into the discharge path. Further, the liquid having entered in a communication passage from the valve means can be recovered into the sealed container from the chamber.

What is claimed is:

1. A liquid shut-off valve device provided with a float valve including a float provided in an upper portion of a sealed container, which receives therein a liquid, and moved according to a liquid level position of the liquid supplied into the sealed container, and
   an open-close valve for closing a discharge path, which discharges a gas in the sealed container, when the float rises to a predetermined position corresponding to the ascent of a liquid level position, the liquid shut-off valve device comprising
   flowrate throttle means having a pressure receiving portion receiving as an urge flow or pressure of a gas moving to the discharge path from within the sealed container, a recess projecting above the pressure receiving portion to be hollowed downward to be opened to an underside of the pressure receiving portion, and a flowrate throttle path, the flowrate throttle means moving independently of the float, when the pressure receiving portion is urged prior to closing of the float valve, to cause the gas in the sealed container to be discharged to the discharge path through the flowrate throttle path to throttle a flowrate of the gas moving to the discharge path from within the sealed container, and
   a connection mechanism provided in the recess of the flowrate throttle means to connect the flowrate throttle means to the float movably in a predetermined range.

2. The liquid shut-off valve device according to claim 1, wherein the flowrate throttle means is provided with a guide member, which is provided on an upper surface of the pressure receiving portion to slide with an inner wall of the device as a guide surface.

3. The liquid shut-off valve device according to claim 1, wherein when the pressure receiving portion is not urged, the flowrate throttle means causes the underside of the pressure receiving portion to abut against an upper surface of the float to move together with the float,
   the underside of the pressure receiving portion is defined by a tapered surface, of which center is inclined downward, and the upper surface of the float is planar.

4. The liquid shut-off valve device according to claim 2, wherein the connection mechanism comprises a stopper provided inside the recess, and a projection having a top, which is held in the recess by the stopper to be movable vertically in a predetermined range in the recess, and extending upward from an upper portion of the float.

5. The liquid shut-off valve device according to claim 1, further comprising:
   a chamber provided above the float valve and the flowrate throttle means,
   an opening in the chamber with the discharge path opened upward,
   a communication passage connecting the chamber, and
   valve means provided in the upper portion of the sealed container to be disposed above the chamber and the device.

* * * * *